United States Patent
Deardurff

(10) Patent No.: US 7,811,369 B2
(45) Date of Patent: Oct. 12, 2010

(54) PHTHALOCYANINE DYES FORMULATED WITH SALTS AND ANTI-FLOCCULENT AROMATIC POLYAMINES FOR INK-JET IMAGING

(75) Inventor: Larrie Deardurff, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 821 days.

(21) Appl. No.: 11/701,039

(22) Filed: Jan. 31, 2007

(65) Prior Publication Data

US 2008/0178764 A1 Jul. 31, 2008

(51) Int. Cl.
C09D 11/02 (2006.01)
B41J 2/01 (2006.01)

(52) U.S. Cl. .............. 106/31.49; 106/31.47; 106/31.43; 347/100

(58) Field of Classification Search .............. 106/31.49, 106/31.47, 31.43; 347/100
See application file for complete search history.

(56) References Cited

U.S. PATENT DOCUMENTS

| | | | | |
|---|---|---|---|---|
| 5,198,023 A * | 3/1993 | Stoffel | .................... | 106/31.58 |
| 5,428,383 A * | 6/1995 | Shields et al. | .................. | 347/96 |
| 5,536,306 A * | 7/1996 | Johnson et al. | .......... | 106/31.49 |
| 6,059,868 A * | 5/2000 | Kasperchik | ............... | 106/31.43 |
| 6,176,913 B1 * | 1/2001 | Kasperchik et al. | ...... | 106/31.48 |
| 6,550,903 B2 * | 4/2003 | Katsuragi et al. | .............. | 347/96 |
| 6,652,636 B2 * | 11/2003 | Deardurff et al. | ........ | 106/31.49 |
| 6,786,955 B2 * | 9/2004 | Kabalnov | ................. | 106/31.27 |
| 7,052,535 B2 | 5/2006 | Uhlir-Tsang | | |
| 7,476,270 B2 * | 1/2009 | McGorrin | ................. | 106/31.47 |
| 7,479,178 B2 * | 1/2009 | Dodge et al. | ............. | 106/31.49 |
| 7,481,875 B2 * | 1/2009 | Deardurff | ................ | 106/31.49 |
| 7,632,344 B2 * | 12/2009 | McGorrin | ................. | 106/31.49 |
| 2005/0025915 A1 | 2/2005 | Uhlir-Tsang | | |
| 2005/0109236 A1 * | 5/2005 | Yabuki et al. | ............. | 106/31.49 |
| 2006/0201383 A1 | 9/2006 | Moffatt | | |
| 2008/0178766 A1 * | 7/2008 | McGorrin | ................. | 106/31.48 |

* cited by examiner

*Primary Examiner*—Helene Klemanski

(57) ABSTRACT

The present invention is directed to ink-jet inks, ink sets, and methods of printing images. The ink-jet ink can comprise a cyan phthalocyanine dye, a divalent salt, an anti-flocculent aromatic polyamine, and a liquid vehicle. The cyan phthalocyanine dye can be susceptible to destabilization by the presence of the salt, and the anti-flocculent aromatic polyamine can be present at a concentration that stabilizes the cyan phthalocyanine dye in the presence of the divalent salt.

31 Claims, No Drawings

PHTHALOCYANINE DYES FORMULATED WITH SALTS AND ANTI-FLOCCULENT AROMATIC POLYAMINES FOR INK-JET IMAGING

BACKGROUND OF THE INVENTION

The use of digital image-forming apparatuses such as, for example, thermal ink-jet printers, large-format plotters, piezo-electric printers, laser printers, silver halide grade photo imaging apparatuses, and others has grown in recent years. The growth may be attributed to substantial improvements in print resolution and overall print quality coupled with appreciable reduction in cost, and ease of use. Today's image-forming apparatuses offer acceptable print quality for many commercial, business and household applications at costs lower than that offered in the past.

To illustrate advancement in the art that has evolved, there has been great interest in the area of reactive inks. These inks are designed such that a reaction occurs between two different inks at a border therebetween, e.g., an interaction such as precipitation occurs. This interaction can improve the edge acuity and/or color to color bleed between inks, and is typically particularly useful for plain paper applications. For example, in order to have good black to color bleed and halo control, many ink-jet ink sets have been designed so that contact between the black and color inks promote destabilization of the black color causing it to agglomerate on the page. This can be accomplished by adding materials to the color inks that cause precipitation of the black, usually acids or multivalent metal salts.

In general, a successful ink for color ink-jet printing often has the following properties: good crusting resistance, good stability, appropriate viscosity and surface tension, rapid dry time, low color-to-black bleed on plain and other papers, and/or consumer-safety. When placed into a thermal ink-jet system, the ink set should also be kogation-resistant.

Accordingly, it would be desirable to provide inks for use in ink-jet printing, which when used individually as well as in combination with other inks, have acceptable print quality, reliability performance, and/or environmental robustness.

DETAILED DESCRIPTION OF THE PREFERRED EMBODIMENT(S)

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

In describing and claiming the present invention, the following terminology will be used in accordance with the definitions set forth below.

It is noted that, as used herein, the singular forms of "a," "an," and "the" include plural referents unless the context clearly dictates otherwise. Thus, for example, reference to "an ink" includes one or more of such inks, or reference to "a dye" includes reference to one or more amounts of dyes.

As used herein, "vehicle," "liquid vehicle" or "ink vehicle" refers to the liquid fluid in which colorant is placed to form an ink. Liquid vehicles are well known in the art, and a wide variety of liquid vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. The liquid vehicle can also carry other additives such as latexes, polymers, UV curable materials, and/or plasticizers, in some embodiments.

As used herein, "ink" refers to a single liquid vehicle that contains at least a dye or a pigment, and in accordance with embodiments of the present invention, some inks can include blending (secondary) colorants and/or certain anti-flocculent aromatic polyamines.

As used herein, the term "set" refers to a set of inks, whether packaged or made available as part of a set, or packaged and made available separately for use with other members of the set.

As used herein, the term "fastness" refers to that property of the printed image which helps maintain its color characteristics (e.g., Hue, Value, Chroma) which may include light fastness, ozone fastness, water fastness, or a combination thereof.

As used herein the term "fade" refers to fading of the colored image due to environmental conditions such as ozone, light, other atmospheric pollutants, or combinations thereof.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

The present invention is directed to inks which can be used for ink-jet printing (e.g. piezoelectric or thermal ink-jet printing). In one embodiment, the inks of the present invention are formulated for use in thermal ink-jet printing systems such as the DESKJET®, DESIGNJET®, PHOTOSMART®, or other similar family of printers, which are commercially available from the Hewlett-Packard Company of Delaware. The inks of the present invention are particularly useful for imaging and photo printers, including home and commercial printers. The inks of the present invention are useful for printing on inorganic porous particulate coated media (e.g., silica and/or alumina coated media), polymeric swellable media (e.g., hydrophilic polymer or gelatin coated media), or particularly, on paper substrates, such as plain paper and uncoated paper. Exemplary print media that can be used includes, but is not limited to, Hewlett-Packard Advanced Glossy Photo Paper, Ilford Galerie Pearl Photo Ink-jet Paper (semi-gloss), Epson Premium Glossy Photo Paper, Pictorico Photo Gallery glossy paper, and one or more of a variety of plain papers.

In one embodiment, a cyan ink-jet ink can include a cyan dye, a salt, an anti-flocculent aromatic polyamine additive, and a liquid vehicle. More specifically, an ink-jet ink can be prepared in accordance with embodiments of the present invention which includes a cyan phthalocyanine dye; a divalent salt; an anti-flocculent aromatic polyamine; and a liquid vehicle. In this embodiment, the cyan phthalocyanine dye can be susceptible to destabilization by the presence of the salt, and the anti-flocculent aromatic polyamine can be present in the cyan ink at a concentration that stabilizes the cyan phthalocyanine dye in the presence of the divalent salt. This ink can be present in an ink set which includes a black ink-jet ink which contains a black self-dispersed pigment colorant that is surface treated or chemically modified with functional groups.

In another embodiment, a method of printing an image on media can comprise jetting a cyan ink-jet ink onto media, and jetting a black ink-jet ink onto the media. The cyan ink-jet ink can comprise a cyan phthalocyanine dye, a divalent salt, an anti-flocculent aromatic polyamine, and a first liquid vehicle. The black ink-jet ink can comprise a black colorant that is reactive with the divalent salt, and a second liquid vehicle. The black ink-jet ink can be printed in contact with the cyan ink-jet ink such that they react with one another on the media, thereby providing cyan to black bleed control. Further, the cyan phthalocyanine dye can be susceptible to destabilization by the presence of the salt in the cyan ink-jet ink, but the anti-flocculent aromatic polyamine is present in the cyan ink-jet ink at a concentration that stabilizes the cyan phthalocyanine dye in the presence of the divalent salt.

In accordance with these embodiments, it was found that certain anti-flocculent aromatic polyamines can enable or allow for a divalent salt to be added to the ink which would otherwise be incompatible with a phthalocyanine dye contained therein. Specifically, certain phthalocyanine dyes have very good properties with respect to color fastness, reduced image fade, etc. Thus, to use these dyes in ink-jet ink formulations for plain paper applications, e.g., in an ink set with a black pigment-based ink for plain paper applications, it would be desirable to include a divalent salt for bleed control. However, such salts, when included at desirable bleed controlling concentrations, can cause the cyan phthalocyanine dye to destabilize or precipitate within an ink chamber prior to jetting. When the anti-flocculent aromatic polyamine is added in the formulation, salts can be co-formulated with the phthalocyanine dyes at acceptable concentrations for bleed control, e.g., 1.5 wt % to about 5 wt % salt based on the weight of the ink as a whole, without undesired flocculation or precipitation within the ink chamber. For example, significant precipitation occurs when the salt is added to such inks at as low as 2 wt %, and lower concentrations of salt also precipitate, diminishing the quality of the ink. This being said, even with this aromatic polyamine additive which is an anti-flocculent for the phthalocyanine dye, surprisingly, such inks will still precipitate with a black pigment-based ink, e.g., text black ink, to stop cyan to black (as well as mixed colors blue, green, and grey) bleed or wicking (movement of one ink into the other). Without this amine compound, these cyan phthalocyanine dyes precipitate in the presence of the divalent salt, causing the pen to fail. As a further note, this additive can also aid in keeping the viscosity of the ink at a desirable level, e.g., from 1 cP to 5 cP. When this additive is not present, the viscosity of an ink with $Mg(NO_3)_2$ added can increase to levels above this desirable viscosity range. Additionally, improved reliability, e.g., decap and recovery, and gloss on swellable photo media is also enhanced by the use of such an anti-flocculent aromatic polyamine additive.

Further detail regarding the cyan phthalocyanine dye, anti-flocculent aromatic polyamine, salt, and liquid vehicle is set forth below. Specifically, the cyan dye can have a structure in accordance with Formula 1, as follows:

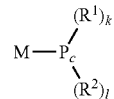

Formula 1 where M represents a hydrogen atom or a metal atom (or an oxide, hydroxide, or halide thereof), and $P_c$ represents a phthalocyanine nucleus. $R^1$ and $R^2$ each independently represent a substituent selected from the group of $—SOX^1$, $—SO_2X^1$, $SO_2NX^2X^3$, $—SO_3X^4$, where $X^1$, $X^2$, $X^3$, and $X^4$ each independently represents a hydrogen atom, a substituted or unsubstituted alkyl group, a substituted or unsubstituted aryl group, or a substituted or unsubstituted heterocyclic group. At least one of $R^1$ or $R^2$ has an ionic hydrophilic group as a substituent. Additionally, k and l each independently represents an integer ranging from 1 to 3. Typically, k and l each independently is selected such that k+l equals 4. Additionally, $R^1$ can be $—SO—(CH_2)_3—SO_3Q$ or $—SO_2—(CH_2)_3—SO_3Q$; and/or $R^2$ can be $—SO_2—(CH_2)_3—SO_2NH—C_2H_4OC_2H_4OH$ or $—SO_2—(CH_2)_3—SO_2NH—CH_2CH(OH)CH_3$. In these embodiments, Q can be lithium, sodium, potassium, ammonium, tetramethylammonium, or a combination thereof. In yet another embodiment, Q can be lithium or potassium. In a further embodiment, Q can be lithium. In one specific embodiment, $R^1$ can be $—SO_2—(CH_2)_3—SO_3Q$, $R^2$ can be $—SO_2—(CH_2)_3—SO_2NH—CH_2CH(OH)CH_3$, k can be 3, and Q can be lithium.

The cyan ink can also include additional dyes or colorants. In one embodiment, the cyan ink further includes at least one additional dye, such as Direct Blue 199 (DB199), Direct Blue 86 (DB86), Direct Blue 87 (DB87), Direct Blue 307 (DB307), Acid Blue 7, or Acid Blue 9 (AB9). In another embodiment, the cyan ink includes AB9, or the sodium or lithium salt of AB9. In another embodiment, the AB9 is added to the cyan ink in an amount of from about 0.01 to about 1 wt %, from about 0.05 to about 0.5 wt %, or from about 0.07 to about 0.4 wt %.

Table I below, provides exemplary phthalocyanine dyes in accordance with embodiments of the present invention, where the substituents $R^1$ and $R^2$ is each introduced at the β-position. However, it should be appreciated by those skilled in the art, that although the preferred dye has the R substituent at the β-position, the dye and the ink containing the same can further include the same basic nucleus with the R substituent at different positions such as the α-position. In the exemplary dyes shown in Table I, M is copper (Cu).

TABLE I

| Cyan Dye | $R_1$ | k | $R_2$ | I |
|---|---|---|---|---|
| C1 | —SO—$(CH_2)_3$—$SO_3K$ | 3 | —$SO_2$—$(CH_2)_3$—$SO_2NH$—$C_2H_4OC_2H_4OH$ | 1 |
| C2 | —$SO_2$—$(CH_2)_3$—$SO_3K$ | 2 | —$SO_2$—$(CH_2)_3$—$SO_2NH$—$C_2H_4OC_2H_4OH$ | 2 |
| C3 | —$SO_2$—$(CH_2)_3$—$SO_3Li$ | 3 | —$SO_2$—$(CH_2)_3$—$SO_2NH$—$CH_2CH(OH)CH_3$ | 1 |
| C4 | —$SO_2$—$(CH_2)_3$—$SO_3Li$ | 2.7 | —$SO_2$—$(CH_2)_3$—$SO_2NH$—$CH_2CH(OH)CH_3$ | 1.3 |
| C5 | —$SO_2$—$(CH_2)_3$—$SO_3Li$ | 2 | —$SO_2$—$(CH_2)_3$—$SO_2NH$—$CH_2CH(OH)CH_3$ | 2 |

The dyes or other colorants in any of the inks described herein can be present in an ink in an amount ranging from about 0.1 wt % to about 10 wt %, from about 0.5 wt % to about 8 wt %, or from about 1 wt % to about 6 wt %, based on the total weight of the ink.

A variety of salts can be used in the above embodiment, particularly when this ink is to be used in an ink set with a black pigment-based ink to precipitate when the pigment contacts the salt on a media substrate. The precipitation can occur when the self-dispersing pigment in the black ink interacts with multi-valent (inorganic or organic) salts present in at least one of the colored (e.g. cyan, pale cyan, magenta, pale magenta, yellow) inks. The multi-valent salts are typically soluble in the ink in the concentration employed. Suitably-employable cations for the multivalent salt include alkaline earth metals of Group 2A of the Periodic Table (e.g. magnesium and calcium). Preferably, calcium and magnesium are employed as the cations. Suitably employed anions associated with the calcium or magnesium can include nitrate, chloride, acetate, perchlorate, formate, or thiocyanate. In one embodiment, calcium nitrate, calcium chloride, calcium acetate, magnesium nitrate, magnesium chloride, magnesium acetate, or a combination thereof can be used. If used, the salt could be present in an amount of from about 1.0 wt % to about 10 wt %, from 1.5 wt % to about 7 wt %, or from 2 wt % to about 6 wt %. The resulting cation concentration can be from 1,000 ppm to 20,000 ppm.

The cyan ink can also include an anti-flocculent aromatic polyamine additive, such as a phenylenediamine compound. One specific phenylenediamine compound that can be used has the structure of Formula 2, as follows:

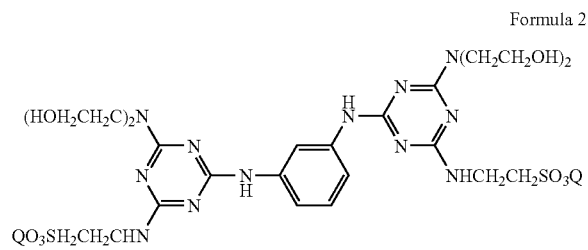

Formula 2 where Q can be Na, Li, K, or a combination thereof.

The presence of an anti-flocculent aromatic polyamine, such as this or another phenylenediamine compound, can act as an anti-flocculent, reducing unwanted aggregation of the cyan phthalocyanine dye in the ink. In one embodiment, a diphenylamine additive improves the quality of the printed images, in particular on swellable media, by reducing coalescence and bronzing of the ink on the printing medium. The anti-flocculent aromatic polyamine can be added to one or more of each ink in an amount generally ranging from about 0.2 wt % to about 14%, from about 1 wt % to about 13%, or from about 1.5 wt % to about 12 wt %, based on the total weight of the ink.

As briefly mentioned, the anti-flocculent aromatic polyamine additive can prevent precipitation between the salt and the cyan phthalocyanine dye, but surprisingly, does not substantially interfere with the precipitation of the black ink-jet ink when printed adjacently to the cyan ink. Self-dispersed pigment particles are surface-treated, or chemically modified, with functional groups so as to render the pigment particles dispersible in the liquid vehicle. Examples of water-dispersible black pigments suitable for use in black ink-jet inks of a common ink set can be made from commercially available pigments obtained from colorant vendors such as Cabot Corp. Although many base black pigments can be used in the above described ink set, the following pigments comprise only a partial list of pigments which can be used. Base Cabot pigments include Monarch 1400, Monarch 1300, Monarch 1100, Monarch 1000, Monarch 900, Monarch 880, and Monarch 700, Cab-O-Jet 200 and Cab-O-Jet 300. Useful pigments available from Columbian include Raven 7000, Raven 5750, Raven 5250, Raven 5000, and Raven 3500. Pigments available from Degussa include Color Black FW 200, Color Black FW 2V, Color Black FW1, Color Black FW 18, Color Black FW S160, Color Black FW S170, Special Black 6, Special Black 5, Special Black 4A, Special Black 4, Printex U, Printex 140U, Printex V, and Printex 140V. In the above list, Cab-O-Jet 200 and Cab-O-Jet 300 represent self-dispersed pigments with surface ionic groups attached. All of the above pigments can use different chemical modifiers.

The vehicle for the inks of the present invention can comprise an aqueous-based vehicle that includes water or a mixture of water and at least one water-soluble organic solvent. Selection of a suitable mixture depends on requirements of the specific application, such as desired surface tension and viscosity, the selected colorant, drying time of the liquid, and the type of substrate onto which the liquid will be printed.

A typical ink vehicle formulation usable in formulating the inks of the present invention may include one or more solvents or co-solvents, which may be added to each ink, in total, in an amount generally ranging from about 1% (wt %) to about 50%; from about 2 to about 45 wt %, or from about 5 to about 35 wt %. Classes of solvents or co-solvents that may be used include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, 1,6-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include tetraethylene glycol; 2-pyrrolidinone; 1,5-pentanediol; 2-ethyl-2-(hydroxymethyl)-1,3-propanediol, and 1-(2-hydroxyethyl)-2-pyrrolidinone.

One or more surfactants may also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, as well as fluorocarbon surfactants such as those formed at least in part from a polymer prepared based on oxetane chemistry. Examples of suitable oxetane-based fluorocarbon surfactants include, but are not limited to those generally available from companies such as Omnova Solutions, Inc. of Fairlawn, Ohio under the trade name of PolyFox fluorocarbon surfactants. Exemplary PolyFox surfactants include PolyFox PF-136A, PolyFox PF-151N, PolyFox PF-154N, PolyFox PF-156A, and PolyFox PF-159. Examples of nonionic and amphoteric surfactants include TERGITOL compounds, which are alkyl polyethylene oxides available from Dow Chemical (Midland, Mich.); Triton compounds, which are alkyl phenyl polyethylene oxide surfactants available from Rohm & Haas Co. (Philadelphia, Pa.); Brij compounds available from ICI Americas (Wilmington, Del.); Pluronic compounds, which are polyethylene oxide/polypropylene oxide block copolymers; Surfynol compounds, which are acetylenic polyethylene oxides available from Air Products (Allentown, Pa.); anionic surfactants such as members of the Dowfax family of diphenyl sulfonate derivatives available from the Dow Chemical Company, and the Crodafos family of phosphate esters available from Croda Incorporated; polyethylene oxide ("POE") esters; POE diesters; POE amines; POE amides; and dimethicone copolyols.

The surfactant, when present, may generally be added to the ink in an amount ranging from about 0.0005 wt % to about 5 wt %, from about 0.0005 to about 2 wt %, from about 0.01 wt.% to about 5 wt.%, from about 0.05 to about 1 wt %, from about 0.1 wt % to about 1 wt %, from about 0.2 wt % to about 0.6 wt %, etc., of the total weight of the ink-jet ink.

Consistent with the invention, various types of additives, may be employed in the inks to optimize the properties of the ink compositions for specific applications. The remainder of the ink compositions may be mostly water; however, other independently selected components including surfactants, humectants, anti-kogation additives, anti-corrosive additives, polymers, preservatives, biocides that inhibit growth of microorganisms (such as the preservative PROXEL™ GXL available from Fuji Film Imaging Colorants); chelating agents (or sequestering agents) such as EDTA that eliminate deleterious effects of heavy metal impurities; buffers to maintain the ink at a desired pH (such as Trizma base, available from Sigma-Aldrich Corp. (Milwaukee, Wis.); 4-morpholineethanesulfonic acid ("MES"); 4-morpholinepropanesulfonic acid ("MOPS"); and beta-hydroxy-4-morpholinepropanesulfonic acid ("MOPSO"); and viscosity modifiers, may be added to improve various properties of the ink composition.

In addition to the properties set forth above, the inks and ink sets of the present invention provide excellent porous media printing, as well as excellent print quality on plain paper. Further, it is also noted that these inks are also acceptable over a fairly wide pH range, but particularly work well within the pH 6 to pH 8.5 range.

EXAMPLES

The following examples illustrate various aspects of the inks and ink sets in accordance with embodiments of the present invention. The following examples should not be considered as limitations of the invention, but should merely teach how to make the best inks, reflecting the present invention.

Example 1

Cyan Ink-Jet Ink

An ink-jet ink is prepared according to Table 1, as follows:

TABLE 1

| Ingredient | Cyan Wt % |
| --- | --- |
| 1-(2-hydroxyethyl)-2-pyrrolidinone | 2-6 |
| 1,5-pentanediol | 2-7 |
| Trimethyolpropane | 5-10 |
| 1,6-hexanediol | 0.5-4 |
| Imidazole | 0.1-2 |
| Surfactant | 0.1-3 |
| EDTA | 0.05-0.5 |
| Salt | 1-5 |
| Biocide | 0.01-0.3 |
| Cyan Phthalocyanine Dye of Formula 1 | 2-5 |
| AB9 | 0.1-1 |
| Anti-flocculent Aromatic Polyamine of Formula 2 | 0.5-5 |
| Buffer | 0-2 |
| Water | Balance |
| pH | 6.2-6.4 |

The ink-jet ink of Table 1 can be used to generate printed images with acceptable ozone resistance and water fastness even when printed on porous media. Further, when printed against a self-dispersed black pigmented ink-jet ink, the cyan ink will precipitate against black ink, thereby providing excellent color-to-black bleed control. The presence of the anti-flocculent aromatic polyamine of Formula 2 allows for increased amounts of salt to be present, while stabilizing the cyan dye of Formula 1 in the composition.

Example 2

Cyan, Magenta, Yellow, and Black Ink Set

An ink set is prepared using the cyan ink of Example 1, and further includes a dye-based magenta ink, a dye-based yellow ink, and a self-dispersed black pigment-based ink where the pigment includes surface ionic groups. The dye-based magenta and yellow inks are formulated in similar vehicles as shown in Example 1. The ink set can be used to print images with acceptably low black to color bleed, as well as acceptable ozone and water fastness.

Example 3

Study Comparing Cyan Phathalocyanine Inks with and without Anti-Flocculent Aromatic Polyamine Additive Approximately 1.5 wt % to 3 wt % of the anti-flocculent aromatic polyamine of Formula 2 (Na salt or Li salt) and from 1 wt % to 3 wt % of Mg(NO₃)₂ is added to an ink that contains a phthalocyanine dye of Formula 1. This ink is then jetted from a typical thermal ink-jet printhead. Alternatively, a similar ink is prepared with the salt but without the anti-flocculent aromatic polyamine of Formula 2. The anti-flocculent aromatic polyamine was found to significantly prevent precipitation between the dye and the divalent salt within the formulation. In the absence of the anti-flocculent aromatic polyamine of Formula 2, the cyan dye would not function in the thermal ink-jet architecture. For example, at 3 wt % Mg(NO₃)₂, an ink containing the cyan phthalocyanine dye precipitated and formed a solid mass inside the ink jet pen. At 1 wt % salt loading, partial precipitation occurred leading to plugged nozzles in the thermal ink-jet architecture that could not be recovered, e.g., solid particles formed in the architecture channels that could not be redissolved. In the presence of 2 wt % of the anti-flocculent aromatic polyamine of Formula 2, this same ink functioned without issue.

It is noted that the Mg(NO₃)₂ is often used in this ink in order to achieve good color to pigment black ink bleed on plain (non-coated) media. At less than 3 wt % Mg(NO₃)₂, the cyan to black bleed was only marginally beneficial for use in consumer printer. Higher concentrations provide better bleed control in this system, and the anti-flocculent aromatic polyamine enabled higher salt loading.

In addition, it was found that the decap time (time between firings that a given nozzle in a thermal ink-jet print head will fire correctly) decreased when less then 2 wt % of the anti-flocculent aromatic polyamine was present, though decap was still acceptable above 2 wt %. Further, it was observed that the viscosity of the ink was at a minimum in the 1 wt % range. At higher and lower amounts of the anti-flocculent aromatic polyamine, the ink viscosity increased, though at 2 wt % or slightly above, the viscosity was still acceptable. Without the anti-flocculent aromatic polyamine being added, the viscosity was unacceptably high with 3% Mg(NO₃)₂* 6H2O (3.8 cps Vs 5.6 cps).

In addition to the advantages when printed on plain paper with respect to cyan to black pigment bleed control, this ink performed well on swellable photo print media, such as HP Premium Plus Glossy. The gloss of the cyan patches improved in the presence of 1.5 wt % or more of the anti-flocculent aromatic polyamine.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. An ink-jet ink, comprising:
   (a) a cyan phthalocyanine dye;
   (b) a divalent salt;
   (c) an anti-flocculent aromatic polyamine; and
   (d) a liquid vehicle,
   wherein the cyan phthalocyanine dye is susceptible to destabilization by the presence of the salt, and wherein the anti-flocculent aromatic polyamine is present at a concentration that stabilizes the cyan phthalocyanine dye in the presence of the divalent salt.

2. The ink-jet ink of claim 1, wherein the cyan phthalocyanine dye has the structure:

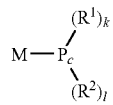

wherein
M is a hydrogen atom; a metal atom; or an oxide, hydroxide, or halide of the metal atom;
$P_c$ is a phthalocyanine nucleus;
$R^1$ and $R^2$ are independently a substituent selected from the group consisting of —$SOX^1$, —$SO_2X^1$, $SO_2NX^2X^3$, —$SO_3X^4$; where $X^1$, $X^2$, $X^3$, and $X^4$ are independently a hydrogen atom, a substituted or unsubstituted $C_1$ to $C_7$ alkyl group, a substituted or unsubstituted aryl group, or a substituted or unsubstituted heterocyclic group; wherein at least one of $R^1$ or $R^2$ has an ionic hydrophilic group as a substituent; and
k and l are independently an integer ranging from 1 to 3, where the sum of k and l is 4.

3. The ink-jet ink of claim 1, wherein the salt comprises Mg(NO₃)₂, or a hydrate thereof.

4. The ink-jet ink of claim 1, wherein the salt comprises from about 1.5 wt % to about 5 wt % of the ink.

5. The ink-jet ink of claim 1, wherein the divalent salts comprise Group 2A divalent cations, the Group 2A divalent cations being present in a concentration from 1,000 ppm to 20,000 ppm.

6. The ink jet ink of claim 1, wherein the anti-flocculent aromatic polyamine is a phenylenediamine compound.

7. The ink-jet ink of claim 6, wherein the phenylenediamine compound has the structure:

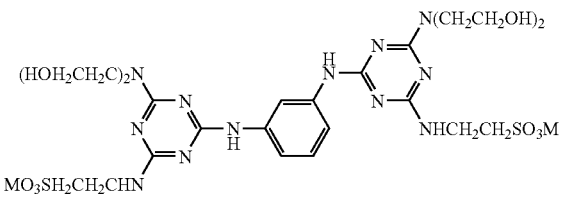

wherein M is Na or Li.

8. The ink-jet ink of claim 6, wherein the phenylenediamine compound concentration in the ink is from about 0.5 wt % to about 14 wt % based on the total weight of the ink.

9. The ink-jet ink of claim 6, wherein the cyan phthalocyanine dye and the phenylenediamine compound are added to the ink, respectively, at concentrations from about 2 wt % to about 8 wt % and from about 3 wt % to about 12 wt %, respectively, based on the total weight of the ink.

10. A method of printing an image on media, comprising:
   (a) jetting a cyan ink-jet ink onto media, said cyan ink-jet ink comprising:
      i) a cyan phthalocyanine dye,
      ii) a divalent salt selected from the group consisting of calcium nitrate, calcium chloride, calcium acetate, calcium thiocyanate, calcium formate, calcium perchlorate, magnesium nitrate, magnesium chloride, magnesium acetate, magnesium thiocyanate, magnesium formate, magnesium perchlorate, and combinations thereof,
      iii) an anti-flocculent aromatic polyamine, and
      iv) a first liquid vehicle; and
   (b) jetting a black ink-jet ink onto the media, said black ink-jet ink comprising:
      i) a black colorant that is reactive with the divalent salt, and
      ii) a second liquid vehicle;
   wherein the black ink-jet ink is printed in contact with the cyan ink-jet ink such that they react with one another on the media, thereby providing cyan to black bleed control, wherein the cyan phthalocyanine dye is susceptible to destabilization by the presence of the salt in the cyan ink-jet ink, and wherein the anti-flocculent aromatic polyamine is present in the cyan ink-jet ink at a concentration that stabilizes the cyan phthalocyanine dye in the presence of the divalent salt.

11. The method of claim 10, wherein the cyan phthalocyanine dye has the structure:

$$M-P_c\diagup^{(R^1)_k}_{(R^2)_l}$$

wherein

M is a hydrogen atom; a metal atom; or an oxide, hydroxide, or halide of the metal atom;

$P_c$ is a phthalocyanine nucleus;

$R^1$ and $R^2$ are independently a substituent selected from the group consisting of $-SOX^1$, $-SO_2X^1$, $SO_2NX^2X^3$, $-SO_3X^4$; where $X^1, X^2, X^3$, and $X^4$ are independently a hydrogen atom, a substituted or unsubstituted $C_1$ to $C_7$ alkyl group, a substituted or unsubstituted aryl group, or a substituted or unsubstituted heterocyclic group; wherein at least one of $R^1$ or $R^2$ has an ionic hydrophilic group as a substituent; and k and l are independently an integer ranging from 1 to 3, where the sum of k and l is 4.

12. The method of claim 11, wherein the cyan ink jet ink further comprises a second blending dye.

13. The method of claim 12, wherein the second blending dye is AB9, AB7, or a combination thereof.

14. The method of claim 10, wherein the salt comprises from about 1.5 wt % to about 5 wt % of the ink.

15. The method of claim 10, wherein the anti-flocculent aromatic polyamine is a phenylenediamine compound.

16. The method of claim 15, wherein the phenylenediamine compound has the structure:

[Chemical structure: triazine-phenylene-triazine compound with (HOH$_2$CH$_2$C)$_2$N, N(CH$_2$CH$_2$OH)$_2$, NHCH$_2$CH$_2$SO$_3$M, and MO$_3$SH$_2$CH$_2$CHN substituents]

wherein M is Na or Li.

17. The method of claim 15, wherein the phenylenediamine compound concentration in the ink is from about 0.5 wt % to about 14 wt % based on the total weight of the ink.

18. The method of claim 10, wherein the black colorant is a self-dispersed pigment having surface reactive groups.

19. The method of claim 10, further comprising jetting at least a magenta ink-jet ink and a yellow ink-jet ink on the media to generate a full color image.

20. An ink-jet ink, comprising:
(a) a cyan phthalocyanine dye;
(b) a divalent salt selected from the group consisting of calcium nitrate, calcium chloride, calcium acetate, calcium thiocyanate, calcium formate, calcium perchlorate, magnesium nitrate, magnesium chloride, magnesium acetate, magnesium thiocyanate, magnesium formate, magnesium perchlorate, and combinations thereof;
(c) an anti-flocculent aromatic polyamine; and
(d) a liquid vehicle, wherein the cyan phthalocyanine dye is susceptible to destabilization by the presence of the salt, and wherein the anti-flocculent aromatic polyamine is present at a concentration that stabilizes the cyan phthalocyanine dye in the presence of the divalent salt.

21. The ink-jet ink of claim 20, wherein the cyan phthalocyanine dye has the structure:

$$M-P_c\diagup^{(R^1)_k}_{(R^2)_l}$$

wherein

M is a hydrogen atom; a metal atom; or an oxide, hydroxide, or halide of the metal atom;

$P_c$ is a phthalocyanine nucleus;

$R^1$ and $R^2$ are independently a substituent selected from the group consisting of $-SOX^1$, $-SO_2X^1$, $SO_2NX^2X^3$, $-SO_3X^4$; where $X^1, X^2, X^3$, and $X^4$ are independently a hydrogen atom, a substituted or unsubstituted $C_1$ to $C_7$ alkyl group, a substituted or unsubstituted aryl group, or a substituted or unsubstituted heterocyclic group; wherein at least one of $R^1$ or $R^2$ has an ionic hydrophilic group as a substituent; and k and l are independently an integer ranging from 1 to 3, where the sum of k and l is 4.

22. The ink-jet ink of claim 20, wherein the anti-flocculent aromatic polyamine is a phenylenediamine compound.

23. The ink-jet ink of claim 22, wherein the phenylenediamine compound has the structure:

[Chemical structure: triazine-phenylene-triazine compound with (HOH$_2$CH$_3$C)$_2$N, N(CH$_2$CH$_2$OH)$_2$, NHCH$_2$CH$_2$SO$_3$M, and MO$_3$SH$_2$CH$_2$CHN substituents]

wherein M is Na or Li.

24. An ink-jet ink, comprising:
(a) a cyan phthalocyanine dye having the structure:

$$M-P_c\diagup^{(R^1)_k}_{(R^2)_l}$$

wherein

M is a hydrogen atom; a metal atom; or an oxide, hydroxide, or halide of the metal atom;

$P_c$ is a phthalocyanine nucleus;

$R^1$ and $R^2$ are independently a substituent selected from the group consisting of $-SOX^1$, $-SO_2X^1$, $SO_2NX^2X^3$, $-SO_3X^4$; where $X^1, X^2, X^3$, and $X^4$ are independently a hydrogen atom, a substituted or unsubstituted $C_1$ to $C_7$ alkyl group, a substituted or unsubstituted aryl group, or a substituted or unsubstituted heterocyclic group; wherein at least one of $R^1$ or $R^2$ has an ionic hydrophilic group as a substituent; and k and l are independently an integer ranging from 1 to 3, where the sum of k and l is 4;

(b) a divalent salt;
(c) an anti-flocculent aromatic polyamine;
(d) a liquid vehicle; and
(e) a second blending dye,
wherein the cyan phthalocyanine dye is susceptible to destabilization by the presence of the salt, and wherein the anti-flocculent aromatic polyamine is present at a concentration that stabilizes the cyan phthalocyanine dye in the presence of the divalent salt.

25. The ink-jet ink of claim 24, wherein the second blending dye is AB9, AB7, or a combination thereof.

26. An ink set for ink-jet printing, comprising:
(a) an ink-jet ink, comprising:
a cyan phthalocyanine dye;
a divalent salt;
an anti-flocculent aromatic polyamine; and
a liquid vehicle,
wherein the cyan phthalocyanine dye is susceptible to destabilization by the presence of the salt, and wherein the anti-flocculent aromatic polyamine is present at a concentration that stabilizes the cyan phthalocyanine dye in the presence of the divalent salt; and
(b) a black ink-jet ink which includes a self-dispersed pigment that is surface treated or chemically modified with functional groups.

27. The ink set of claim 26, further comprising a magenta ink and a yellow ink.

28. The ink set of claim 27, further comprising a pale cyan ink and a pale magenta ink.

29. An ink-jet ink, comprising:
(a) a cyan phthalocyanine dye having the structure

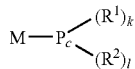

wherein
M is a hydrogen atom; a metal atom; or an oxide, hydroxide, or halide of the metal atom;
$P_c$ is a phthalocyanine nucleus;

$R^1$ and $R^2$ are independently a substituent selected from the group consisting of $-SOX^1$, $-SO_2X^1$, $SO_2NX^2X^3$, $-SO_3X^4$; where $X^1$, $X^2$, $X^3$, and $X^4$ are independently a hydrogen atom, a substituted or unsubstituted $C_1$ to $C_7$ alkyl group, a substituted or unsubstituted aryl group, or a substituted or unsubstituted heterocyclic group; wherein at least one of $R^1$ or $R^2$ has an ionic hydrophilic group as a substituent; and k and l are independently an integer ranging from 1 to 3, where the sum of k and l is 4;

(b) a divalent salt selected from the group consisting of calcium nitrate, calcium chloride, calcium acetate, calcium thiocyanate, calcium formate, calcium perchlorate, magnesium nitrate, magnesium chloride, magnesium acetate, magnesium thiocyanate, magnesium formate, magnesium perchlorate, and combinations thereof;
(c) an anti-flocculent aromatic polyamine;
(d) a liquid vehicle; and
(e) a second blending dye,
wherein the cyan phthalocyanine dye is susceptible to destabilization by the presence of the salt, and wherein the anti-flocculent aromatic polyamine is present at a concentration that stabilizes the cyan phthalocyanine dye in the presence of the divalent salt.

30. The ink-jet ink of claim 29, wherein the second blending dye is AB9, AB7, or a combination thereof.

31. An ink set for ink-jet printing, comprising
(a) a cyan ink-jet ink, comprising:
a cyan phthalocyanine dye;
a divalent salt selected from the group consisting of calcium nitrate, calcium chloride, calcium acetate, calcium thiocyanate, calcium formate, calcium perchlorate, magnesium nitrate, magnesium chloride, magnesium acetate, magnesium thiocyanate, magnesium formate, magnesium perchlorate, and combinations thereof;
an anti-flocculent aromatic polyamine; and
a liquid vehicle; and
(b) a black ink-jet ink which includes a self-dispersed pigment that is surface treated or chemically modified with functional groups,
wherein the cyan phthalocyanine dye is susceptible to destabilization by the presence of the salt, and wherein the anti-flocculent aromatic polyamine is present at a concentration that stabilizes the cyan phthalocyanine dye in the presence of the divalent salt.

* * * * *

UNITED STATES PATENT AND TRADEMARK OFFICE
CERTIFICATE OF CORRECTION

PATENT NO.        : 7,811,369 B2
APPLICATION NO.   : 11/701039
DATED             : October 12, 2010
INVENTOR(S)       : Larrie Deardurff It is certified that error appears in the above-identified patent and that said Letters Patent is hereby corrected as shown below:

In column 10, line 23, in Claim 6, delete "ink jet" and insert -- ink-jet --, therefor.

In column 11, line 31, in Claim 12, delete "ink jet" and insert -- ink-jet --, therefor.

Signed and Sealed this
Twelfth Day of July, 2011

David J. Kappos
*Director of the United States Patent and Trademark Office*